United States Patent
Burmaster et al.

(10) Patent No.: US 7,241,850 B2
(45) Date of Patent: Jul. 10, 2007

(54) POLYPROPYLENE HAVING IMPROVED CLARITY AND ARTICLES PREPARED THEREFROM

(75) Inventors: Douglas Burmaster, Houston, TX (US); Owen Hodges, Friendswood, TX (US); J. Layne Lumus, Dickenson, TX (US); Lu Ann Kelly, Friendswood, TX (US); Mark Murphy, Beach City, TX (US)

(73) Assignee: Fina Technology, Inc., Houston, TX (US)

( * ) Notice: Subject to any disclaimer, the term of this patent is extended or adjusted under 35 U.S.C. 154(b) by 63 days.

(21) Appl. No.: 11/012,315

(22) Filed: Dec. 15, 2004

(65) Prior Publication Data

US 2006/0128842 A1 Jun. 15, 2006

(51) Int. Cl.
*C08F 110/06* (2006.01)

(52) U.S. Cl. .................. 526/351; 526/348.1; 526/160; 526/943

(58) Field of Classification Search ................ 526/351, 526/160, 943, 348.1
See application file for complete search history.

(56) References Cited

U.S. PATENT DOCUMENTS

| | | | |
|---|---|---|---|
| 4,794,096 A | 12/1988 | Ewen | 502/117 |
| 4,975,403 A | 12/1990 | Ewen | 502/113 |
| 5,026,798 A | 6/1991 | Canich | 526/127 |
| 5,449,651 A | 9/1995 | Reddy et al. | 502/117 |
| 5,643,847 A | 7/1997 | Walzer, Jr. | 502/117 |
| 5,703,187 A | 12/1997 | Timmers | 526/282 |
| 5,747,406 A | 5/1998 | Reichle et al. | 502/117 |
| 5,849,852 A | 12/1998 | Koch et al. | 526/96 |
| 5,859,653 A | 1/1999 | Aoki et al. | 347/8 |
| 5,869,723 A | 2/1999 | Hinokuma et al. | 556/402 |
| 5,929,147 A * | 7/1999 | Pierick et al. | 524/99 |
| 6,069,213 A | 5/2000 | Nemzek et al. | 526/113 |
| 6,407,177 B1 * | 6/2002 | Shamshoum et al. | 525/240 |

FOREIGN PATENT DOCUMENTS

| | | | |
|---|---|---|---|
| JP | 07-242776 | * | 9/1995 |
| JP | 08-269266 | * | 10/1996 |
| JP | 2004-307671 | * | 11/2004 |
| WO | WO98/07515 | | 2/1998 |
| WO | WO98/32775 | | 7/1998 |

* cited by examiner

*Primary Examiner*—Ling-Sui Choi
(74) *Attorney, Agent, or Firm*—William D. Jackson; Tenley R. Krueger

(57) ABSTRACT

A polypropylene composition comprises an isotactic polypropylene homopolymer resin that is suitable to form an injected molded article exhibiting less than about 60% haze, as determined by ASTM D1003, at a thickness of 0.05 inch without clarity-enhancing agents. The polypropylene composition has particular application to injection molded articles and may have a melt flow rate of from about 0.1 g/10 min to about 150 g/10 min as determined by ASTM D-1238, Procedure B. The resin may be prepared using a metallocene catalyst, and the composition may include clarity-enhancing agents for even greater clarity improvements.

7 Claims, No Drawings

POLYPROPYLENE HAVING IMPROVED CLARITY AND ARTICLES PREPARED THEREFROM

BACKGROUND OF THE INVENTION

1. Technical Field

This invention relates to propylene polymers and more particularly to polypropylenes useful for applications requiring good clarity.

2. Background of the Art

Propylene-based polymers are finding increasing numbers of applications in the thermoplastics industry. These polymers offer relatively good strength and other performance properties when used in applications such as, for example, disposable food containers. Unfortunately, injection molded articles prepared from Ziegler-Natta catalyzed isotactic polypropylene homopolymers often have a hazy or cloudy appearance. The haziness or cloudiness tends to increase as the thickness of the molded part increases, which often renders these materials less desirable for use in preparing injection molded articles.

Clarity-enhancing agents may be used in attempts to counter this haze problem. Such are usually added to the melted polymer either in the formation of pellets or prior to injection of the polymer into the mold. In general, clarity-enhancing agents provide a site within the polymer resin for crystallization to occur. This allows smaller crystallites to form, which, in turn, allows light to travel through the polymer medium, rather than be diffracted. While clarity-enhancing agents may be helpful, such are often relatively expensive and thus, their use is desirably minimized.

Thus, it would be desirable in the art to identify polypropylene materials that exhibit improved clarity or gloss, with or without the use of clarity-enhancing agents.

SUMMARY OF THE INVENTION

In one embodiment the invention is a polypropylene composition comprising an isotactic polypropylene homopolymer resin. This resin is suitable to form an injection molded article that exhibits less than about 60% haze, as determined by ASTM D1003, at a thickness of about 0.05 inch, in the absence of clarity-enhancing agents. Clarity-enhancing agents may optionally be included in the composition for even greater clarity improvements.

In another embodiment the invention is an article formed from such composition.

In still another embodiment the invention is a method of forming a polypropylene article. The method comprises introducing the composition as a molten resin under pressure into a mold cavity having a desired shape, allowing the molten resin to solidify within the mold to form an article, and removing the article from the mold cavity.

DETAILED DESCRIPTION OF THE INVENTION

In recent years, metallocene catalysts have been employed for producing stereospecific polymers. Metallocene catalysts are generally characterized as having two cyclopentadienyl rings attached to a transition metal, such as zirconium, titanium or hafnium. In particular, chiral, stereorigid metallocene catalysts have been found especially useful in polymerizing highly isotactic polyolefins. A chiral compound is one that is non-superimposable on its mirror image. Examples of such catalysts for producing isotactic polyolefins are disclosed in, for example, U.S. Pat. Nos. 4,794,096 and 4,975,403, and published European patent application EP 0856525, each of which is incorporated herein by reference.

It has been found that desirable isotactic polypropylene (iPP) homopolymer resins may be produced using metallocene catalysts. Such resins may be used in injection molding applications wherein they exhibit certain desirable properties. As used herein, unless otherwise specified, the term "polypropylene" or "polypropylene homopolymers" means polypropylene homopolymers containing less than about 0.01 percent, by weight of polymer, of any comonomer (such as ethylene). The metallocene catalyst systems described herein may be high activity metallocene catalyst systems, e.g., catalyst systems having an activity of 500 g polyolefin produced/(gcat*hr) or more, or an efficiency of 2500 or more, or an efficiency of 5000 or more.

Metallocene catalysts may be characterized generally as coordination compounds incorporating one or more cyclopentadienyl (Cp) groups (which may be substituted or unsubstituted, each substitution being the same or different) coordinated with a transition metal through π bonding. The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst useful herein is a bulky ligand metallocene compound generally represented by the formula:

$$[L]_m M[A]_n;$$

where L is a bulky ligand, A is a leaving group, M is a transition metal and m and n are such that the total ligand valency corresponds to the transition metal valency. For example, m may be from 1 to 3 and n may be from 1 to 3.

The metal atom "M" of the metallocene catalyst compound, as described throughout the specification and in the claims, may be selected from Groups 3 through 12 atoms and lanthanide Group atoms in one embodiment; and selected from Groups 3 through 10 atoms in a more particular embodiment, and selected from Sc, Ti, Zr, Hf, V, Nb, Ta, Mn, Re, Fe, Ru, Os, Co, Rh, Ir, and Ni in yet a more particular embodiment; and selected from Groups 4, 5 and 6 atoms in yet a more particular embodiment, and Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated.

The bulky ligand [L] generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

Cp typically includes 7-bonded and/or fused ring(s) or ring systems. The ring(s) or ring system(s) typically include atoms selected from group 13 to 16 atoms, for example, carbon, nitrogen, oxygen, silicon, sulfur, phosphorus, germanium, boron, aluminum and combinations thereof, wherein carbon makes up at least 50% of the ring members. Non-limiting examples include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5, 6,7-tetrahydroindenyl, or "H$_4$Ind"), substituted versions thereof, and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorus, silicon, germanium, aluminum, boron and combinations thereof. Also, a substituent group R group such as 1-butanyl may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra-and pentafluorophenyls) in yet a more particular embodiment; and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —C$_6$F$_5$ (pentafluorophenyl)), fluorinated alkylcarboxylates (e.g., CF$_3$C(O)O$^-$), hydrides and halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methoxy, ethoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. A bridged metallocene, for example, may be described by the general formula:

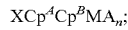

XCp$^A$Cp$^B$MA$_n$;

wherein X is a structural bridge, Cp$^A$ and Cp$^B$ each denote a cyclopentadienyl group, each being the same or different and which may be either substituted or unsubstituted, M is a transition metal; A is an alkyl, hydrocarbyl or halogen group; and n is an integer between 0 and 4, and either 1 or 2 in a particular embodiment.

Non-limiting examples of bridging groups (X) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, R$_2$C=, R$_2$Si=, —Si(R)$_2$Si(R$_2$)—, R$_2$Ge=, RP= (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more Rs may be joined to form a ring or ring system. In one embodiment, the bridged metallocene catalyst component has two or more bridging groups (X).

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethyl-silyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl.

In another embodiment, the bridging group may also be cyclic, and include 4 to 10 ring members or 5 to 7 ring members in a more particular embodiment. The ring members may be selected from the elements mentioned above, and/or from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be cis-, trans-, or a combination thereof.

The cyclic bridging groups may be saturated or unsaturated and/or carry one or more substituents and/or be fused to one or more other ring structures. If present, the one or more substituents are selected from the group hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group of those having 4 to 10 ring members, more particularly 5, 6 or 7 ring members (selected from the group of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

In one embodiment, the metallocene catalyst may be a CpFlu Type catalyst (e.g., a metallocene incorporating a substituted Cp fluorenyl ligand structure) represented by the following formula:

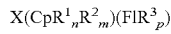

$$X(CpR^1{}_nR^2{}_m)(FlR^3{}_p)$$

wherein Cp is a cyclopentadienyl group, Fl is a fluorenyl group, X is a structural bridge between Cp and Fl, $R^1$ is a substituent on the Cp, n is 1 or 2, $R^2$ is a substituent on the Cp at a position which is proximal to the bridge, m is 1 or 2, each $R^3$ is the same or different and is a hydrocarbyl group having from 1 to 20 carbon atoms with $R^3$ being substituted on a nonproximal position on the fluorenyl group and at least one other $R^3$ being substituted at an opposed nonproximal position on the fluorenyl group and p is 2 or 4.

In yet another aspect, the metallocene catalyst includes bridged mono-ligand metallocene compounds (e.g., mono cyclopentadienyl catalyst components). In this embodiment, the at least one metallocene catalyst component is a bridged "half-sandwich" metallocene catalyst. In yet another aspect of the invention, the at least one metallocene catalyst component is an unbridged "half sandwich" metallocene.

Described another way, the "half sandwich" metallocenes above are described in U.S. Pat. Nos. 6,069,213, 5,026,798, 5,703,187, and 5,747,406, including a dimer or oligomeric structure, such as are disclosed in, for example, U.S. Pat. Nos. 5,026,798 and 6,069,213, which are incorporated by reference herein.

Non-limiting examples of metallocene catalyst components consistent with the description herein include:
cyclopentadienylzirconium$A_n$,
indenylzirconium$A_n$,
(1-methylindenyl)zirconium$A_n$,
(2-methylindenyl)zirconium$A_n$,
(1-propylindenyl)zirconium$A_n$,
(2-propylindenyl)zirconium$A_n$,
(1-butylindenyl)zirconium$A_n$,
(2-butylindenyl)zirconium$A_n$,
methylcyclopentadienylzirconium$A_n$,
tetrahydroindenylzirconium$A_n$,
pentamethylcyclopentadienylzirconium$A_n$,
cyclopentadienylzirconium$A_n$,
pentamethylcyclopentadienyltitanium$A_n$,
tetramethylcyclopentyltitanium$A_n$,
(1,2,4-trimethylcyclopentadienyl)zirconium$A_n$,
dimethylsilyl(1,2,3,4-tetramethylcyclopentadienyl)(cyclopentadienyl)zirconium$A_n$,
dimethylsilyl(1,2,3,4-tetramethylcyclopentadienyl)(1,2,3-trimethylcyclopentadienyl)zirconium$A_n$,
dimethylsilyl(1,2,3,4-tetramethylcyclopentadienyl)(1,2-dimethylcyclopentadienyl)zirconium$A_n$,
dimethylsilyl(1,2,3,4-tetramethylcyclopentadienyl)(2-methylcyclopentadienyl)zirconium$A_n$,
dimethylsilylcyclopentadienylindenylzirconium$A_n$,
dimethylsilyl(2-methylindenyl)(fluorenyl)zirconium$A_n$,
diphenylsilyl(1,2,3,4-tetramethylcyclopentadienyl)(3-propylcyclopentadienyl)zirconium$A_n$,
dimethylsilyl(1,2,3,4-tetramethylcyclopentadienyl)(3-t-butylcyclopentadienyl)zirconium$A_n$,
dimethylgermyl(1,2-dimethylcyclopentadienyl)(3-isopropylcyclopentadienyl)zirconium$A_n$,
dimethylsilyl(1,2,3,4-tetramethylcyclopentadienyl)(3-methylcyclopentadienyl)zirconium$A_n$,
diphenylmethylidene(cyclopentadienyl)(9-fluorenyl)zirconium$A_n$,
diphenylmethylidenecyclopentadienylindenylzirconium$A_n$,
isopropylidenebiscyclopentadienylzirconium$A_n$,
isopropylidene(cyclopentadienyl)(9-fluorenyl)zirconium$A_n$,
isopropylidene(3-methylcyclopentadienyl)(9-fluorenyl)zirconium$A_n$,
ethylenebis(9-fluorenyl)zirconium$A_n$,
mesoethylenebis(1-indenyl)zirconium$A_n$,
ethylenebis(1-indenyl)zirconium$A_n$,
ethylenebis(2-methyl-1-indenyl)zirconium$A_n$,
ethylenebis(2-methyl-4,5,6,7-tetrahydro-1-indenyl)zirconium$A_n$,
ethylenebis(2-propyl-4,5,6,7-tetrahydro-1-indenyl)zirconium$A_n$,
ethylenebis(2-isopropyl-4,5,6,7-tetrahydro-1-indenyl)zirconium$A_n$,
ethylenebis(2-butyl-4,5,6,7-tetrahydro-1-indenyl)zirconium$A_n$,
ethylenebis(2-isobutyl-4,5,6,7-tetrahydro-1-indenyl)zirconium$A_n$,
dimethylsilyl(4,5,6,7-tetrahydro-1-indenyl)zirconium$A_n$,
diphenyl(4,5,6,7-tetrahydro-1-indenyl)zirconium$A_n$,
ethylenebis(4,5,6,7-tetrahydro-1-indenyl)zirconium$A_n$,
dimethylsilylbis(cyclopentadienyl)zirconium$A_n$,
dimethylsilylbis(9-fluorenyl)zirconium$A_n$,
dimethylsilylbis(1-indenyl)zirconium$A_n$,
dimethylsilylbis(2-methylindenyl)zirconium$A_n$,
dimethylsilylbis(2-propylindenyl)zirconium$A_n$,
dimethylsilylbis(2-butylindenyl)zirconium$A_n$,
diphenylsilylbis(2-methylindenyl)zirconium$A_n$,
diphenylsilylbis(2-propylindenyl)zirconium$A_n$,
diphenylsilylbis(2-butylindenyl)zirconium$A_n$,
dimethylgermylbis(2-methylindenyl)zirconium$A_n$,
dimethylsilylbistetrahydroindenylzirconium$A_n$,
dimethylsilylbistetramethylcyclopentadienylzirconium$A_n$,
dimethylsilyl(cyclopentadienyl)(9-fluorenyl)zirconium$A_n$,
diphenylsilyl(cyclopentadienyl)(9-fluorenyl)zirconium$A_n$,
diphenylsilylbisindenylzirconium$A_n$,
cyclotrimethylenesilyltetramethylcyclopentadienylcyclopentadienylzirconium$A_n$,
cyclotetramethylenesilyltetramethylcyclopentadienylcyclopentadienylzirconium$A_n$, cyclotrimethylenesilyl(tetramethylcyclopentadienyl)(2-methylindenyl)zirconium$A_n$,
cyclotrimethylenesilyl(tetramethylcyclopentadienyl)(3-methylcyclopentadienyl)zirconium$A_n$,
cyclotrimethylenesilylbis(2-methylindenyl)zirconium$A_n$,
cyclotrimethylenesilyl(tetramethylcyclopentadienyl)(2,3,5-trimethylclopentadienyl)zirconium$A_n$,
cyclotrimethylenesilylbis(tetramethylcyclopentadienyl)zirconium$A_n$,
dimethylsilyl(tetramethylcyclopentadieneyl)(N-tertbutylamido)titanium$A_n$,
biscyclopentadienylchromium$A_n$,
biscyclopentadienylzirconium$A_n$,
bis(n-butylcyclopentadienyl)zirconium$A_n$,
bis(n-dodecyclcyclopentadienyl)zirconium$A_n$,
bisethylcyclopentadienylzirconium$A_n$,
bisisobutylcyclopentadienylzirconium$A_n$,
bisisopropylcyclopentadienylzirconium$A_n$,
bismethylcyclopentadienylzirconium$A_n$,
bisnoxtylcyclopentadienylzirconium$A_n$,
bis(n-pentylcyclopentadienyl)zirconium$A_n$,
bis(n-propylcyclopentadienyl)zirconium$A_n$,
bistrimethylsilylcyclopentadienylzirconium$A_n$,
bis(1,3-bis(trimethylsilyl)cyclopentadienyl)zirconium$A_n$,
bis(1-ethyl-2-methylcyclopentadienyl)zirconium$A_n$,
bis(1-ethyl-3-methylcyclopentadienyl)zirconium$A_n$,
bispentamethylcyclopentadienylzirconium$A_n$,
bispentamethylcyclopentadienylzirconium$A_n$,
bis(1-propyl-3-methylcyclopentadienyl)zirconium$A_n$,
bis(1-n-butyl-3-methylcyclopentadienyl)zirconium$A_n$,
bis(1-isobutyl-3-methylcyclopentadienyl)zirconium$A_n$,
bis(1-propyl-3-butylcyclopentadienyl)zirconium$A_n$,
bis(1,3-n-butylcyclopentadienyl)zirconium$A_n$,
bis(4,7-dimethylindenyl)zirconium$A_n$,
bisindenylzirconium$A_n$,
bis(2-methylindenyl)zirconium$A_n$,
cyclopentadienylindenylzirconium$A_n$,
bis(n-propylcyclopentadienyl)hafnium$A_n$,
bis(n-butylcyclopentadienyl)hafnium$A_n$,
bis(n-pentylcyclopentadienyl)hafnium$A_n$,
(n-propylcyclopentadienyl)(n-butylcyclopentadienyl)hafnium$A_n$,
bis[(2-trimethylsilylethyl)cyclopentadienyl]hafnium$A_n$,
bis(trimethylsilylcyclopentadienyl)hafnium$A_n$,
bis(2-n-propylindenyl)hafnium$A_n$,
bis(2-n-butylindenyl)hafnium$A_n$,
dimethylsilylbis(n-propylcyclopentadienyl)hafnium$A_n$,
dimethylsilylbis(n-butylcyclopentadienyl)hafnium$A_n$,
bis(9-n-propylfluorenyl)hafnium$A_n$,
bis(9-n-butylfluorenyl)hafnium$A_n$,
(9-n-propylfluorenyl)(2-n-propylindenyl)hafnium$A_n$,
bis(1-n-propyl-2-methylcyclopentadienyl)hafnium$A_n$,
(n-propylcyclopentadienyl)(1-n-propyl-3-n-butylcyclopentadienyl)hafnium$A_n$,
dimethylsilyltetramethylcyclopentadienylcyclopropylamidotitanium$A_n$,
dimethylsilyltetramethylcyclopentadienylcyclobutylamidotitanium$A_n$,
dimethylsilyltetramethylcyclopentadienylcyclopentylamidotitanium$A_n$,
dimethylsilyltetramethylcyclopentadienylcyclohexylamidotitanium$A_n$,
dimethylsilyltetramethylcyclopentadienylcycloheptylamidotitanium$A_n$,
dimethylsilyltetramethylcyclopentadienylcyclooctylamidotitanium$A_n$,
dimethylsilyltetramethylcyclopentadienylcyclononylamidotitanium$A_n$,
dimethylsilyltetramethylcyclopentadienylcyclodecylamidotitanium$A_n$,
dimethylsilyltetramethylcyclopentadienylcycloundecylamidotitanium$A_n$,
dimethylsilyltetramethylcyclopentadienylcyclododecylamidotitanium$A_n$,
dimethylsilyltetramethylcyclopentadienyl(sec-butylamido)titanium$A_n$,
dimethylsilyl(tetramethylcyclopentadienyl)(n-octylamido)titanium$A_n$,
dimethylsilyl(tetramethylcyclopentadienyl)(n-decylamido)titanium$A_n$,
dimethylsilyl(tetramethylcyclopentadienyl)(n-octadecylamido)titanium$A_n$,
methylphenylsilyltetramethylcyclopentadienylcyclopropylamidotitanium$A_n$,
methylphenylsilyltetramethylcyclopentadienylcyclobutylamidotitanium$A_n$,
methylphenylsilyltetramethylcyclopentadienylcyclopentylamidotitanium$A_n$,
methylphenylsilyltetramethylcyclopentadienylcyclohexylamidotitanium$A_n$,
methylphenylsilyltetramethylcyclopentadienylcycloheptylamidotitanium$A_n$,
methylphenylsilyltetramethylcyclopentadienylcyclooctylamidotitanium$A_n$,
methylphenylsilyltetramethylcyclopentadienylcyclononylamidotitanium$A_n$,
methylphenylsilyltetramethylcyclopentadienylcyclodecylamidotitanium$A_n$,
methylphenylsilyltetramethylcyclopentadienylcycloundecylamidotitanium$A_n$,
methylphenylsilyltetramethylcyclopentadienylcyclododecylamidotitanium$A_n$,
methylphenylsilyl(tetramethylcyclopentadienyl)(sec-butylamido)titanium$A_n$,
methylphenylsilyl(tetramethylcyclopentadienyl)(n-octylamido)titanium$A_n$,
methylphenylsilyl(tetramethylcyclopentadienyl)(n-decylamido)titanium$A_n$,
methylphenylsilyl(tetramethylcyclopentadienyl)(n-octadecylamido)titanium$A_n$,
diphenylsilyltetramethylcyclopentadienylcyclopropylamidotitanium$A_n$,
diphenylsilyltetramethylcyclopentadienylcyclobutylamidotitanium$A_n$,
diphenylsilyltetramethylcyclopentadienylcyclopentylamidotitanium$A_n$,
diphenylsilyltetramethylcyclopentadienylcyclohexylamidotitanium$A_n$,
diphenylsilyltetramethylcyclopentadienylcycloheptylamidotitanium$A_n$,
diphenylsilyltetramethylcyclopentadienylcyclooctylamidotitanium$A_n$,
diphenylsilyltetramethylcyclopentadienylcyclononylamidotitanium$A_n$,
diphenylsilyltetramethylcyclopentadienylcyclodecylamidotitanium$A_n$,
diphenylsilyltetramethylcyclopentadienylcycloundecylamidotitanium$A_n$,
diphenylsilyltetramethylcyclopentadienylcyclododecylamidotitanium$A_n$,
diphenylsilyl(tetramethylcyclopentadienyl)(sec-butylamido)titanium$A_n$, diphenylsilyl(tetramethylcyclopentadienyl)(n-octylamido)titaniumA$_n$,
diphenylsilyl(tetramethylcyclopentadienyl)(n-decylamido)titaniumA$_n$,
diphenylsilyl(tetramethylcyclopentadienyl)(n-octadecylamido)titaniumA$_n$, and derivatives and combinations thereof.

As used herein, the term "metallocene activator" is defined to be any compound or combination of compounds, supported or unsupported, which may activate a single-site catalyst compound (e.g., metallocenes, Group 15 containing catalysts, etc.) Typically, this involves the abstraction of at least one leaving group (A group in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO"), and alkylaluminum compounds as activators, to activate desirable metallocenes described herein. MAO and other aluminum-based activators are well known in the art. Non-limiting examples of aluminum alkyl compounds which may be utilized as activators for the catalysts described herein include trimethylaluminum, triethylaluminum, triisobutylaluminum, tri-n-hexylaluminum, tri-n-octylaluminum and the like.

Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds, and mixtures thereof (e.g., tri(n-butyl)ammonium tetrakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, and alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from the group alkyls having 1 to 4 carbon groups, phenyl, naphthyl and mixtures thereof. In yet another embodiment, the three groups are selected from the group highly halogenated alkyls having 1 to 4 carbon groups, highly halogenated phenyls, and highly halogenated naphthyls and mixtures thereof. By "highly halogenated", it is meant that at least 50 percent of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

Illustrative, not limiting examples of ionic ionizing activators include trialkyl-substituted ammonium salts such as triethylammoniumtetraphenylboron, tripropylammoniumtetraphenylboron, tri(n-butyl)ammoniumtetraphenylboron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl)boron, tributylammoniumtetra(pentafluorophenyl)boron, tri(n-butyl)ammoniumtetra(o-tolyl)boron and the like; N,N-dialkylanilinium salts such as N,N-dimethylaniliniumtetraphenylboron, N,N-diethylaniliniumtetraphenylboron, N,N-2,4,6-pentamethylaniliniumtetraphenylboron and the like; dialkyl ammonium salts such as diisopropylammoniumtetrapentafluorophenylboron, dicyclohexylammoniumtetraphenylboron and the like; triaryl phosphonium salts such as triphenylphosphoniumtetraphenylboron, trimethylphenylphosphoniumtetraphenylboron, tridimethylphenylphosphoniumtetraphenylboron and the like, and their aluminum equivalents.

In yet another embodiment, an alkylaluminum may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example a halogenated aryl group. In one embodiment the halogen is selected from the group consisting of chlorine, bromine and fluorine, and selected from the group consisting of fluorine and bromine in another embodiment, and the halogen is fluorine in yet another embodiment.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5,-dimethylpyrroles, 3-pentafluorophenylpyrrole, 4,5,6,7-tetrafluoroindole or 3,4-difluoropyrroles.

In one embodiment, the heterocyclic compound described above is combined with an alkyl aluminum or an alumoxane to yield an activator compound which, upon reaction with a catalyst component, for example a metallocene, produces an active polymerization catalyst. Non-limiting examples of alkylaluminums include trimethylaluminum, triethylaluminum, triisobutylaluminum, tri-n-hexylaluminum, tri-n-octylaluminum, tri-iso-octylaluminum, triphenylaluminum, and combinations thereof.

Other activators include those described in WO 98/07515 such as tris(2,2',2"-nonafluorobiphenyl) fluoroaluminate, which is incorporated by reference herein. Combinations of activators are also contemplated by the invention, for example, alumoxanes and ionizing activators in combinations. Other activators include aluminum/boron complexes, perchlorates, periodates and iodates including their hydrates; lithium (2,2'-bisphenyl-ditrimethylsilicate)-4T-HF; silylium salts in combination with a non-coordinating compatible anion. Also, methods of activation such as using radiation, electro-chemical oxidation, and the like are also contemplated as activating methods for the purposes of rendering the neutral metallocene-type catalyst compound or precursor to a metallocene-type cation capable of polymerizing olefins. Other activators or methods for activating a metallocene-type catalyst compound are described in, for example, U.S. Pat. Nos. 5,849,852, 5,859,653 and 5,869,723 and WO 98/32775.

In general, the activator and catalyst component(s) are combined in mole ratios of activator to catalyst component from 1000:1 to 0.1:1 in one embodiment, and from 300:1 to 1:1 in a more particular embodiment, and from 150:1 to 1:1 in yet a more particular embodiment, and from 50:1 to 1:1 in yet a more particular embodiment, and from 10:1 to 0.5:1 in yet a more particular embodiment, and from 3:1 to 0.3:1 in yet a more particular embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 2,000:1 in a more particular embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet a more particular embodiment.

More particularly, the molar ratio of Al/metallocene-metal (Al from MAO) ranges from 40 to 500 in one embodiment, ranges from 50 to 400 in another embodiment, ranges from 60 to 300 in yet another embodiment, ranges from 70 to 200 in yet another embodiment, ranges from 80 to 175 in yet another embodiment; and ranges from 90 to 125 in yet another embodiment, wherein a desirable molar ratio of Al(MAO) to metallocene-metal "M" may be any combination of any upper limit with any lower limit described herein.

The activators may or may not be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347-1374 (2000).

Metallocene catalysts may be supported or unsupported. Typical support materials may include talc, inorganic oxides, clays and clay minerals, ion-exchanged layered compounds, diatomaceous earth compounds, zeolites or a resinous support material, such as a polyolefin.

Specific inorganic oxides include silica, alumina, magnesia, titania and zirconia, for example. The inorganic oxides used as support materials may have an average particle size of from 30 microns to 600 microns, or from 30 microns to 100 microns, a surface area of from 50 $m^2/g$ to 1,000 $m^2/g$, or from 100 $m^2/g$ to 400 $m^2/g$, a pore volume of from 0.5 cc/g to 3.5 cc/g, or from 0.5 cc/g to 2 cc/g.

Desirable methods for supporting metallocene ionic catalysts are described in U.S. Pat. No. 5,643,847; Ser. Nos. 09184358 and 09184389, which are incorporated by reference herein. The methods generally include reacting neutral anion precursors that are sufficiently strong Lewis acids with the hydroxyl reactive functionalities present on the silica surface such that the Lewis acid becomes covalently bound.

When the activator for the metallocene supported catalyst composition is an NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art.

In some embodiments the metallocene catalyst is desirably chiral. Chirality in a metallocene catalyst enables stereochemical control over the polymer product and produces a polymer with a high isotactic index. In addition, the catalyst is desirably stereo-rigid to further enhance stereochemical control of the polymerization.

Preparation of metallocene catalysts in general may be found described in, for example, U.S. Pat. No. 5,449,651, the disclosure of which is incorporated herein by reference. In general, the silica support material is first impregnated with the activator or cocatalyst, such as methylalumoxane, in the given proportion, with at least half of the activator or co-catalyst being disposed within the internal pore volume of the silica. The silica is then contacted with a dispersion of the metallocene catalyst in a hydrocarbon, desirably aromatic, solvent. The catalyst dispersion and silica which contains the activator or cocatalyst may then be mixed together at a temperature of about 10° C. or less, for a period of time sufficient to enable the metallocene to become reactively supported on the activator/cocatalyst-impregnated silica particles. This mixing time may vary from a few minutes to several hours. The supported catalyst is then recovered from the hydrocarbon solvent and is generally washed. The washing may be done in stages. An aromatic hydrocarbon solvent wash may be done first. Following this, an optional second wash may be carried out with a second aromatic hydrocarbon solvent to remove any unsupported metallocene from the supported catalyst. Finally, a paraffinic hydrocarbon wash may be done to remove remaining aromatic solvent from the supported catalyst. The washing procedures, like the mixing of the metallocene solvent dispersion and activator/cocatalyst-containing silica, are desirably carried out at the relatively low temperature of about 10° C. or less. Following washing the washed catalyst is desirably not dried, with the result that it will contain a substantial residue of the paraffinic hydrocarbon solvent.

Thereafter, the washed catalyst may be dispersed in a viscous mineral oil having a viscosity substantially greater than that of the paraffinic hydrocarbon solvent. Typically, the mineral oil has a viscosity, at 40° C., of at least about 65 centistokes as measured by ASTM D445. In contrast, the viscosity of the paraffinic hydrocarbon solvent is usually less than about 1 centipoise at a temperature of about 10° C. This viscosity difference removes most of the paraffinic hydrocarbon solvent.

The final catalyst dispersion desirably has a significant metal loading measured as weight percent in the dispersion. In one embodiment this metal loading is from about 0.5 to about 6 weight percent. In another embodiment this metal loading is from about 1 to about 3 weight percent, and in still another embodiment this metal loading is about 2 weight percent in the dispersion.

Those skilled in the art will appreciate that a variety of modifications in the above generalized catalyst preparation method may be made without significantly altering the outcome. Therefore, it will be understood that additional description of methods and means of preparing the catalyst are outside of the scope of the invention, and that it is only the identification of metallocenes as the required catalysts that is necessarily described herein.

Once the catalyst has been thus obtained, the inventive isotactic polypropylene homopolymers may be prepared using those polymerization processes that are well known in the art. Examples of such polymerization processes include slurry, gas-phase, and liquid-bulk polymerization. In slurry polymerization processes, polymerization occurs in the presence of a solvent, e.g. hexane, within a loop or continuous stirred tank (CSTR) reactor. Polymerization may also be carried out by bulk-phase polymerization, wherein liquid propylene serves as both monomer and diluent. In a typical bulk process, one or more loop reactors are usually used. In other embodiments the polymer may be produced by gas phase polymerization of propylene, which is typically carried out in a fluidized bed reactor. Polymer fluff or powder produced from the polymerization reaction is removed from the reactor and may then be subjected to extrusion to produce desired pellets. Reaction conditions, including time, temperature, pressure, and residence profile, may be any known or used in the art. Agitation or mixing may be accomplished using any conventional stirring or circulating means to ensure appropriate contact between the monomers and the catalyst.

The metallocene catalyst provides an isotactic polypropylene homopolymer resin that desirably has a greater clarity than Ziegler-Natta-catalyzed isotactic polypropylene resins when comparing materials of comparable melt flow rates. In particular, the inventive polypropylene homopolymer may be used to produce an injection molded article that exhibits less than about 60% haze, as determined according to ASTM D1003, at a thickness of 0.05 inch (50 mils) without the use of a clarity-enhancing agent. Articles of lesser thickness desirably exhibit even less haze, which is equivalent to higher clarity. This is in contrast to polypropylene resins of similar melt flow rates produced with Ziegler-Natta catalysts. Such articles may exhibit a much higher level of haze, particularly in the absence of clarity-enhancing agents. In some such cases the articles may exhibit a haze in excess of 70%.

The polypropylene homopolymer resin may also have a lower xylene solubles content as compared to polypropylene homopolymers prepared from conventional Ziegler-Natta catalysts. The xylene solubles content for polypropylene resins of the present invention may, in some embodiments, be less than about 3.5 percent by weight of polymer. In other embodiments the xylene solubles content may be less than about 2 percent, and in still other embodiments it may be less than about 1 percent, by weight of polymer.

The polypropylene homopolymer resins may also have a narrower molecular weight distribution, i.e., a relatively lower polydispersity (Mw/Mn), than equivalent polypropylene prepared using conventional Ziegler-Natta catalysts. In one embodiment the polydispersity (molecular weight distribution) of the inventive polypropylene homopolymer resins is less than about 7 polydisperity units. In another embodiment it is from about 2 to about 7 polydisperity units. In yet another embodiment it is from about 2 to about 4 polydisperity units, and in still another embodiment it is from about 3 to about 4 polydisperity units.

The inventive polypropylene is suitable for injection molding applications and in one embodiment may have a melt flow rate (MFR) of from about 0.1 g/10 min to about 150 g/10 min. Melt flow rate is determined according to ASTM D-1238, Procedure B. In another embodiment the MFR is from about 10 to about 60 g/10 min. In still another embodiment the MFR is from about 15 to about 30 g/10 min.

In preparing injection molded articles, the polymer is introduced, along with any additives, into an injection molding unit where the polymer is simultaneously mixed, heated and pressurized until the desired final melt temperature, viscosity and pressure are obtained. Typically, the final melt temperature prior to injection is from about 340° F. to about 600° F., with pressures ranging from about 100 psi to about 30,000 psi. The pressurized molten polymer is then injected through an injection nozzle into a mold having a mold cavity of the desired shape. Once the molten polymer has cooled and solidified within the mold, the mold is opened to release the molded article and the process is repeated.

For injection molded articles, wall thickness may be, in one embodiment, at least about 0.01 inch. In another embodiment the thickness may be from about 0.02 inch to about 0.25 inch.

In using the isotactic polypropylene resins to produce injection molded articles, it is desirably in some embodiments to include clarity-enhancing agents to ensure even better clarity performance. Injection molded articles formed from the inventive resins, which have been modified with a clarity-enhancing agent, may, in one embodiment, desirably exhibit less than about 20% haze at a thickness of about 0.05 inch. In other embodiments they may exhibit less than about 10% haze at the same thickness. As presented herein, all haze values are measured according to ASTM D1003 on plaques formed using molds having an SPI A-1 chrome finish. As used herein, the expression "clarity-enhancing agent" includes both those materials classified as "clarifying agents" and those classified as "nucleating agents". In some embodiments a single clarity-enhancing agent may be employed. In other embodiments combinations of two or more clarity-enhancing agents may be used.

Suitable clarifying agents may include, for example, the acetals of sorbitols and xylitols and phosphate ester salts. Many such clarifying agents are disclosed in U.S. Pat. No. 5,310,950, the disclosure of which is incorporated herein by reference. Specific examples of acetals of sorbitols include (p-methylbenzylidene) sorbitol and 2, 4 bis (3,4-dimethyidibenzylidene) sorbitol. Examples of suitable commercially available sorbitol-acetal clarifying agents are MILLAD™ 3940 and MILLAD™ 3988, both available from Milliken Chemical, Spartanburg, S.C. Specific examples of phosphate ester salts include 2,2-methylene-bis(4,6-ditertbutylphenyll) phosphate, and aluminum hydroxybis (2,4,8,10-tetrakis (1,1-dimethyl) 6-hydroxy-12H-dibenzo [d, g] [1,2, 3] dioxaphophocin 6-oxidato]. Examples of suitable commercially available phosphate ester salt clarifying agent include ADK stabilizer NA-11A and ADK Stabilizer NA-21, both available from Amfine Chemical Corp., Allendale, N.J. The clarifying agent may be used in an amount of from 0.01 percent by weight of polymer or more. In one embodiment the clarifying agent is used in an amount of from 0.05 percent by weight to about 0.75 percent by weight, and in another embodiment from about 0.1 percent to about 0.5 percent by weight of polymer. In yet another embodiment it is used in an amount from about 0.15 percent to about 0.3 percent by weight of polymer. The clarifying agent, along with other additives, is typically added to the polymer resin during extrusion and prior to injecting molding.

Nucleating agents may also improve clarity, although in some cases to a lesser extent than the clarifying agents. Suitable nucleating agents include minerals, such as talc, aromatic carboxylic salts and dicarboxylic acid salts. Sorbitol acetals and phosphate ester salts, discussed previously, may also act as nucleating agents. Specific examples of aromatic carboxylic salts include sodium benzoate and lithium benzoate. Dicarboxylic acid salts include cis-endo-bicyclo-heptane-2,3-dicarboxylic acid disodium salt. In some embodiments nucleating agents are used in amounts of from about 0.01 to 0.75 percent by weight of polymer, while in other embodiments from about 0.05 to about 0.70 percent is more typical. In still other embodiments the amount is desirably from about 0.05 percent to about 0.5 percent by weight of polymer.

Examples of articles and products that may desirably be prepared using the inventive polypropylene homopolymer resins include injection molded products, such as, for example, housewares, such as food storage containers, cooking utensils (such as cups, measuring cups, strainers, turkey basters, etc.), non-food storage containers and filing cabinets, particularly clear drawers used in such cabinets, and general storage devices (such as organizers, totes, sweater boxes, etc.). Other articles and products may include rigid packaging, such as deli containers and lids (such as those used for dips, spreads, pasta salads, etc.), dairy containers and lids (such as those used for storing cottage cheese, butter, yogurt, etc.), personal care products, bottles and jars. The resin may be combined with other materials, such as particulate material, including talc, calcium carbonate, and fibers, such as glass or graphite fibers, or wood to form composite materials. Examples of such composite materials include components for furniture, automotive components and building materials, particularly those used as lumber replacement.

Although the polypropylene homopolymer resins of the present invention have particular application to forming injection-molded articles, they may also be used for other articles as well, such as films, coatings and fibers. These resins are also suitable for blow molding and thermoforming. Examples of such articles are bags, adhesives, yarns and fabrics, bottles and jars, and plates and cups.

The following examples are provided to further understanding of the described invention. As such they are intended to be, and should be construed as being, illustrative only. Those skilled in the art will understand that modifications and alterations, such as selection of specific catalysts reaction equipment and conditions, injection molding equipment and conditions, additive types and amounts, and the like, may be made to the invention without departing from the scope and spirit thereof.

EXAMPLES

Resin samples for Examples 1, 3 and 5 are compounded on a 1¼-inch WELEX™ extruder using a temperature profile of from about 375 to about 475° F. from the rear of the extruder to the die. For all samples, injection molding is performed on a TOSHIBA™ ISE 170-9A injection molder. Barrel temperatures are from about 375° F. to 420° F., with a mold temperature of approximately 70° F. Tensile strength and Izod bars are molded according to ASTM method D4101.

Testing of the designated properties is carried out according to the following standardized test methods. Tensile strength is measured according to ASTM D638-97. Flexural modulus is measured according to ASTM D790-97. Izod impact strength is measured according to ASTM D256-97. DSC recrystallization and melt peaks are measured according to ASTM D3417-97 and ASTM D418-97, respectively. Heat deflection temperatures (HDT) are measured according to ASTM D648. Haze values are measured on 50 mil plaques according to ASTM D1003 on plaques formed using molds having an SPI A-1 chrome finish. All values presented are based on the average values of five plaques tested.

Example 1

Two samples (Samples 2 and 3) of non-clarified metallocene catalyzed isotactic polypropylene having melt flow rates of 26 g/10 min are compared to non-clarified Ziegler-Natta catalyzed isotactic polypropylene (Sample 1-comparative) of similar melt flow rate.

The results from Example 1 are presented in Table 1 below. Both the Sample 1 and Sample 2 materials comprise similar additives packages including a nucleator. Sample 3 utilizes a different additive package. Notably, this additive package does not include a nucleator, but the molded part prepared from Sample 3 still exhibits significantly less haze than the nucleator-containing comparative Sample 1.

TABLE 1

| Sample | 1*<br>ZNiPP | 2<br>miPP | 3<br>miPP |
|---|---|---|---|
| MFR (g/10 min) | 20 | 26 | 26 |
| Additives (wt. %) | | | |
| Primary Antioxidant | 0.05 | 0.05 | 0.05 |
| Secondary Antioxidant | 0.05 | 0.05 | 0.1 |
| Antistat | 0.4 | 0.41 | 0.65 |
| Nucleator | 0.05 | 0.05 | 0.0 |
| Haze (%) | 71.8 | 57.4 | 60.7 |
| Izod Notched (ft-lbf/in) | 0.6 | 0.4 | 0.2 |
| Izod Un-notched (ft-lbf/in) | 12 | 10.3 | 12.1 |
| 2% Flexural Modulus ($1 \times 10^5$ psi) | 2.3 | 2.3 | 1.8 |
| 1% Flexural Modulus ($1 \times 10^5$ psi) | 2.6 | 2.6 | 2 |
| 0.4% Flexural Modulus ($1 \times 10^5$ psi) | 2.8 | 2.7 | 2.1 |
| Tensile Modulus ($1 \times 10^5$ psi) | 2.5 | 2.6 | 2.2 |
| Tensile Strength at Yield (psi) | 5300 | 5500 | 5000 |
| Tensile Strength at Break (psi) | 3600 | 3400 | 2500 |
| Elongation at Yield (%) | 10 | 12 | 11 |
| Elongation at Break (%) | 19 | 143 | 412 |
| DSC Recrystallization Peak, ° C. | 125 | 118 | 106 |
| DSC Second Melt Peak, ° C. | 165 | 152 | 150 |

*not an example of the invention
—indicates no data measured

Example 2

Using the reaction conditions and materials of Example 1, another sample of the inventive polypropylene homopolymer is prepared. The melt flow rate for this polymer is about 23 g/10 min. Testing yields the results shown in Table 2.

TABLE 2

| Sample | 4<br>miPP |
|---|---|
| MFR (g/10 min) | 23 |
| Additives (wt. %) | |
| Neutralizer | 0.05 |
| Primary Antioxidant | 0.08 |
| Secondary Antioxidant | 0.06 |
| Haze (%) | 59 |
| Izod Notched (ft-lbf/in) | 0.3 |
| Izod Un-notched (ft-lbf/in) | 8.0 |
| 2% Flexural Modulus (1 × $10^5$ psi) | 1.8 |
| 1% Flexural Modulus (1 × $10^5$ psi) | 2.0 |
| 0.4% Flexural Modulus (1 × $10^5$ psi) | 2.1 |
| Tensile Modulus (1 × $10^5$ psi) | 2.1 |
| Tensile Strength at Yield (psi) | 4700 |
| Tensile Strength at Break (psi) | 1700 |
| Elongation at Yield (%) | 11.2 |
| Elongation at Break (%) | 376 |
| HDT, ° C. | 89 |
| DSC Recrystallization Peak, ° C. | — |
| DSC Second Melt Peak, ° C. | — |

—indicates no data taken

Example 3

Clarified metallocene catalyzed isotactic polypropylene having a melt flow rate of 26 g/10 min is compared to clarified Ziegler-Natta catalyzed isotactic polypropylene of similar melt flow. The clarifying agent used is MILLAD™ 3988. The results are presented in Table 3 below.

| Sample | 5*<br>ZNiPP | 6<br>cmiPP |
|---|---|---|
| MFI (g/10 min) | 20 | 26 |
| Additives (wt. %) | | |
| Calcium Stearate | 0.05 | 0.05 |
| Primary Antioxidant | 0.08 | 0.08 |
| Secondary Antioxidant | 0.08 | 0.08 |
| MILLAD™ 3988 | 0.25 | 0.25 |
| Antistat | 0.15 | 0.15 |
| Haze (%) | 18.6 | 9.2 |
| Izod Notched (ft-lbf/in) | 0.4 | 0.3 |
| Izod Un-notched (ft-lbf/in) | 7.6 | 6.4 |
| 2% Flexural Modulus (1 × $10^5$ psi) | 2.5 | 2.6 |
| 1% Flexural Modulus (1 × $10^5$ psi) | 2.8 | 2.9 |
| 0.4% Flexural Modulus (1 × $10^5$ psi) | 2.9 | 3.0 |
| Tensile Modulus (1 × $10^5$ psi) | 2.6 | 2.8 |
| Tensile Strength at Yield (psi) | 5600 | 5700 |
| Tensile Strength at Break (psi) | 3900 | 4600 |
| Elongation at Yield (%) | 12 | 10 |
| Elongation at Break (%) | 19 | 16 |
| DSC Recrystallization Peak, ° C. | 128 | 121 |
| DSC Second Melt Peak, ° C. | 164 | 153 |

*not an example of the invention

As may be seen from Table 3, lower haze is achieved with the inventive metallocene catalyzed propylene polymer of Sample 5, with comparable flexural modulus and tensile strength for the two samples. Tensile strength at break for Sample 6 is also higher than for Sample 5.

Example 4

Clarified metallocene-catalyzed isotactic polypropylene having a melt flow rate of about 30 g/10 min is evaluated. Molecular weight properties are measured through gel permeation chromatography (GPC). The results for Samples 7-9 are presented in Table 4 below.

TABLE 4

| Sample | 9<br>cmiPP |
|---|---|
| MFI (g/10 min) | 31.3 |
| Xylene Solubles, wt. % | 0.28 |
| Additives (wt. %) | |
| Neutralizer | 0.05 |
| Primary Antioxidant | 0.08 |
| Secondary Antioxidant | 0.06 |
| MILLAD™ 3988 | 0.22 |
| Antistat | 0.16 |
| Haze (%) | 11.6 |
| Izod Notched (ft-lb/f/in) | 0.4 |
| Izod Un-notched (ft-lb/f/in) | 6.8 |
| 2% Flexural Modulus (1 × $10^5$ psi) | 2.1 |
| 1% Flexural Modulus (1 × $10^5$ psi) | 2.3 |
| 0.4% Flexural Modulus (1 × $10^5$ psi) | 2.4 |
| Tensile Modulus (1 × $10^5$ psi) | 2.6 |
| Tensile Strength at Yield (psi) | 5460 |
| Tensile Strength at Break (psi) | 1850 |
| Elongation at Yield (%) | 9 |
| Elongation at Break (%) | 205 |
| DSC Recrystallization Peak, ° C. | 123 |
| DSC Second Melt Peak, ° C. | 155 |
| Mn/1000 | 27 |
| Mw/1000 | 139 |
| Mz/1000 | 301 |
| Polydispersity D = Mw/Mn | 5.1 |

Example 5

Clarified metallocene-catalyzed isotactic polypropylene having a melt flow rate of approximately 69 g/10 min is evaluated and clarity is measured at various thicknesses. The clarifying agent used is MILLAD™ 3988 in an amount of about 0.25% by weight of polymer. Haze is measured on plaques of varying thickness that are injected molded using step chip molds having an SPI A-1 chrome finish. The results are presented in Table 5 below.

TABLE 5

| Sample | 10<br>cmiPP |
|---|---|
| MFI (g/10 min) | 69 |
| Additives (wt. %) | |
| Neutralizer | 0.05 |
| Primary Antioxidant | 0.08 |
| Secondary Antioxidant | 0.08 |
| Antistat | 0.15 |
| MILLAD™ 3988 | 0.25 |
| Haze (%) | |
| 20 mil | 5 |
| 40 mil | 10 |
| 60 mil | 17 |
| 80 mil | 23 |
| Izod Notched (ft-lbf/in) | — |
| Izod Un-notched (ft-lbf/in) | — |
| 2% Flexural Modulus (1 × $10^5$ psi) | 2.0 |
| 1% Flexural Modulus (1 × $10^5$ psi) | 2.3 |
| 0.4% Flexural Modulus (1 × $10^5$ psi) | 2.3 |
| Tensile Modulus (1 × $10^5$ psi) | 2.5 |
| Tensile Strength at Yield (psi) | 5500 |
| Tensile Strength at Break (psi) | 4200 |
| Elongation at Yield (%) | 10.9 |

TABLE 5-continued

| Sample | 10 cmiPP |
|---|---|
| Elongation at Break (%) | 16 |
| DSC Recrystallization Peak, ° C. | 122 |
| DSC Second Melt Peak, ° C. | 153 |

—indicates no data taken

What we claim is:

1. An injection molded article comprising an isotactic polypropylene homopolymer resin, wherein the injection molded article has a wall thickness of at least about 0.01 inch and exhibits less than about 60% haze, as determined by ASTM D1003, at a thickness of about 0.05 inch in the absence of clarity-enhancing agents and wherein the isotactic polypropylene homopolymer resin has a melt flow rate of from about 0.1 g/10 min to about 150 g/10 min, as determined by ASTM D-1238, Procedure B.

2. The article of claim 1, wherein the isotactic polypropylene homopolymer resin has less than about 0.01 percent by weight of any comonomer.

3. The article of claim 1, wherein the injection molded article further comprises a clarity-enhancing agent in an amount of from about 0.01 percent to about 0.75 percent by weight of polymer and exhibits less than about 20% haze, as determined by ASTM D1003, at a thickness of about 0.05 inch.

4. The article of claim 3, wherein the injection molded article exhibits less than about 10% haze, as determined by ASTM D1003, at a thickness of about 0.05 inch.

5. The article of claim 3, wherein the clarity-enhancing agent is selected from the group consisting of acetals of sorbitals, acetals of xylitols, phosphate ester salts, minerals, aromatic carboxylic salts and dicarboxylic acid salts, and combinations thereof.

6. The article of claim 3, wherein the clarity-enhancing agent is present in an amount of from about 0.01 percent to about 0.5 percent by weight of polymer.

7. The article of claim 1, wherein the article is selected from the group consisting of housewares, food storage containers, cooking utensils, plates, cups, drinking cups, measuring cups, strainers, turkey basters, non-food storage containers, filing cabinets, cabinet drawers, general storage devices, organizers, totes, sweater boxes, rigid packaging, deli containers, deli container lids, dairy containers, dairy container lids, personal care products, bottles and jars, furniture, furniture components, building materials and building container components, films, coatings, fibers, bags, adhesives, yarn and fabric.

* * * * *